US006981376B2

(12) United States Patent
Dutta

(10) Patent No.: US 6,981,376 B2
(45) Date of Patent: Jan. 3, 2006

(54) APPARATUS FOR CONVERTING GRAVITATIONAL ENERGY TO ELECTRICAL ENERGY

(76) Inventor: Alok Dutta, 1 Lord Roberts Drive, Scarborough (CA) M1K 3W1

( * ) Notice: Subject to any disclaimer, the term of this patent is extended or adjusted under 35 U.S.C. 154(b) by 0 days.

(21) Appl. No.: 10/414,247

(22) Filed: Apr. 16, 2003

(65) Prior Publication Data

US 2003/0197383 A1 Oct. 23, 2003

(30) Foreign Application Priority Data

Apr. 17, 2002 (CA) .................................... 2381442

(51) Int. Cl.
*H02P 9/04* (2006.01)

(52) U.S. Cl. .......................................... 60/639; 290/54

(58) Field of Classification Search .................. 60/398, 60/639, 640; 290/43, 54
See application file for complete search history.

(56) References Cited

U.S. PATENT DOCUMENTS

| | | | | |
|---|---|---|---|---|
| 3,521,445 A * | 7/1970 | Grable | 60/639 |
| 4,286,928 A * | 9/1981 | Clay | 60/639 |
| 4,443,707 A * | 4/1984 | Scieri et al. | 290/54 |
| 5,905,312 A * | 5/1999 | Liou | 290/54 |
| 6,099,274 A * | 8/2000 | Conn | 417/469 |
| 6,445,078 B1 * | 9/2002 | Cieslak, Jr. | 290/54 |

FOREIGN PATENT DOCUMENTS

| | | |
|---|---|---|
| BE | 382236 | 9/1931 |
| GB | 2323638 | 9/1998 |

OTHER PUBLICATIONS

Ord-Hume A W J G: "Perpetual Motion", Perpetual Motion. History of an obsession, New York, St. Martin's Press, US pp. 100-103, XP002067445, the whole document.

* cited by examiner

*Primary Examiner*—Thomas E. Lazo
(74) *Attorney, Agent, or Firm*—Lynn Schumacher Hill & Schumacher

(57) ABSTRACT

The present invention discloses an apparatus of converting gravitational energy to electrical energy. The apparatus includes a reciprocating drive mechanism for lifting liquid from a bottom reservoir to an upper reservoir and turbines between the upper and lower reservoirs which are turned by liquid falling down a flow path from the top reservoir through the turbines to the bottom reservoir. The reciprocating drive mechanism includes a large circular ring or wheel pivotally attached at its hub or center to a support frame and a cable over the upper periphery of the ring with two pipes attached one at each end of the cable. The ring pivots back and forth lifting one pipe and lowering the other pipe and vice versa. As a pipe moves down liquid enters the bottom of the pipe while liquid drains out the top of the pipe into the upper reservoir. One of the turbines is connected to the reciprocating drive mechanism and the other to a generator for producing electricity.

7 Claims, 6 Drawing Sheets

APPARATUS FOR CONVERTING GRAVITATIONAL ENERGY TO ELECTRICAL ENERGY

FIELD OF INVENTION

This invention relates to an apparatus for converting gravitational energy to electrical energy.

BACKGROUND OF THE INVENTION

Every country needs to produce more electricity to meet the ever increasing demands of its people. None of the traditional methods for the production of electricity is completely emission free. Developed countries, under the public pressure of health issues, are shutting down many nuclear power plants all over the world. There is more or less a similar problem with gas, diesel and hydro power plants. Solar energy has limitations and cannot be widely used at present.

At present there are few economical methods of power production which are pollution or emission free and modern civilization and the economy are entirely dependent on electricity. Thus, there is a need for an apparatus for generating electricity which is pollution free and which can be readily assembled and integrated into any part of the world without the need for extensive and sophisticated infrastructure.

SUMMARY OF INVENTION

The present invention provides an apparatus for converting gravitational energy to electrical energy, comprising:

a first tank for holding liquid and a support frame defining a tower extending vertically above said first tank;

a second tank for holding liquid secured to said support frame above said first tank;

at least a third tank for holding liquid secured to said support frame above said second tank;

a reciprocating drive mechanism being connected to the support frame above the third tank, a first turbine secured to said support frame between said second tank and said third tank, said first turbine being in flow communication with said third tank and said second tank, said reciprocating drive mechanism being connected to said first turbine by a rigid link member to assist in driving said reciprocating drive mechanism;

at least a second turbine secured to said support frame between said second tank and said first tank, said second turbine being in flow communication with said second tank and said first tank; and at least one pipe extending vertically, with said pipe having first and second ends with said first end located in said first tank and said second end positioned with respect to said third tank so liquid exiting said second end of said at least one pipe drains into said third tank, said at least one pipe having a first valve located at the first end thereof, said at least one pipe being connected to said reciprocating drive mechanism so that during operation said reciprocating drive mechanism reciprocates the at least one pipe vertically up and down, wherein as the at least one pipe moves down said first valve opens to allow liquid into the pipe and when the pipe moves up said first valve closes, wherein as said at least one pipe moves downwardly liquid flows from said second end of said at least one pipe into the third tank and flows down to said first turbine and rotates said turbine, said liquid flowing down into the second tank and flowing downwardly therefrom into said second turbine and rotates said second turbine, said second turbine being connected to a generator for producing electricity.

The basic feature of this apparatus is not only transformation of gravitational energy to electrical energy, but also, it does not require an external source of fuel and requires no significant infrastructure to produce the apparatus to produce the low cost energy which will eventually be economic for the end users.

BRIEF DESCRIPTION OF DRAWINGS

The following is a description, by way of example only, of apparatus for converting gravitational energy to electrical energy constructed in accordance with the present invention, reference being had to the accompanying drawings, in which.

DETAILED DESCRIPTION OF THE INVENTION

Figure 1:
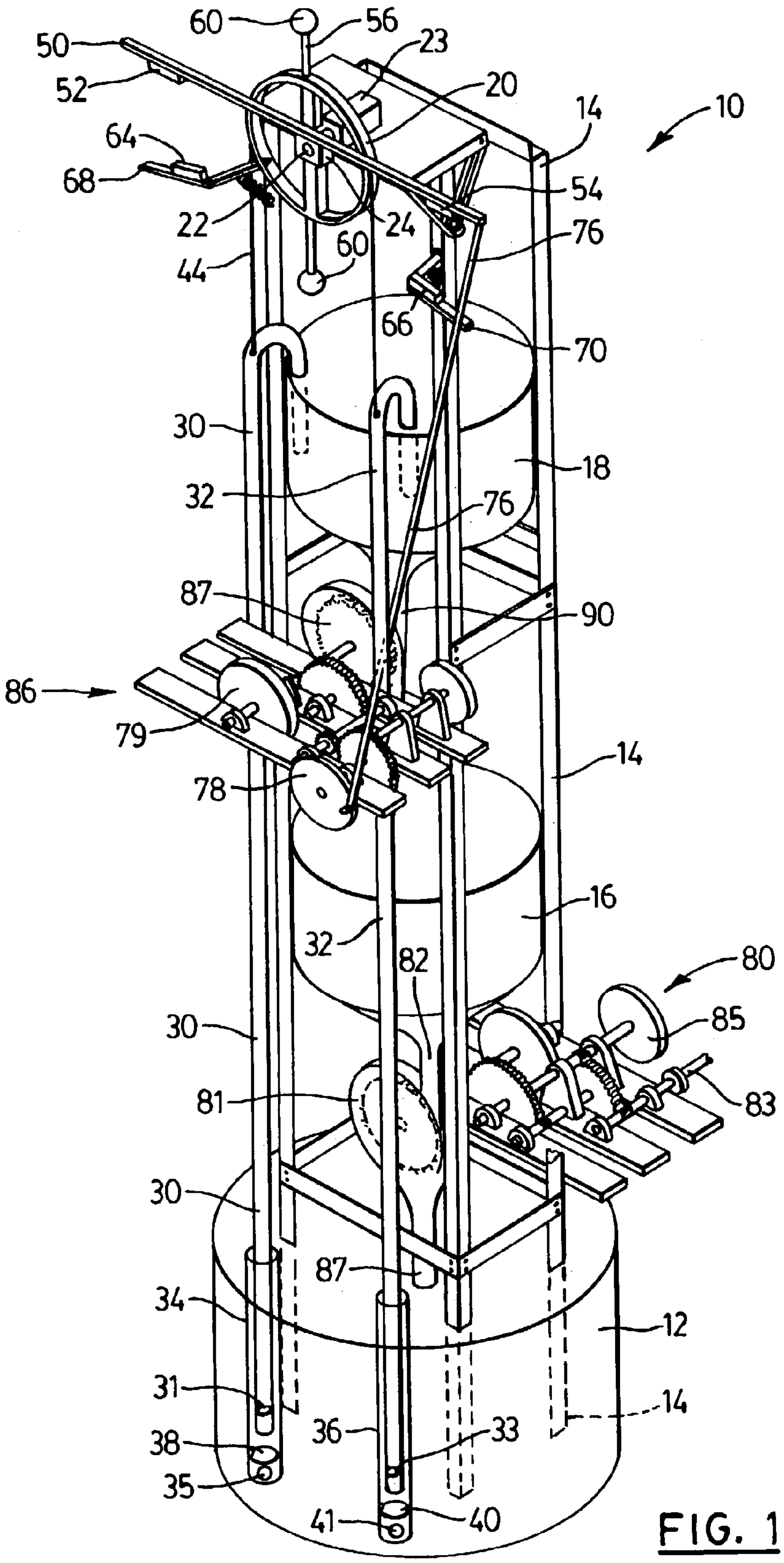
FIG. 1 is a perspective view of the apparatus for converting gravitational energy to electrical energy constructed in accordance with the present invention.

FIG. 1 shows a perspective view of an apparatus 10 for converting gravitational energy to electrical energy constructed in accordance with the present invention. Apparatus 10 includes a first (or lower) reservoir or liquid tank 12 and a support frame 14 that is connected to and supported by liquid reservoir 12. A second (or middle) liquid reservoir 16 is mounted in frame 14 above reservoir 12 and a third (or upper) liquid reservoir 18 is secured within frame 14 above second reservoir 16. The first, second and third reservoirs are positioned vertically with respect to each other one above the other.

Figure 2:
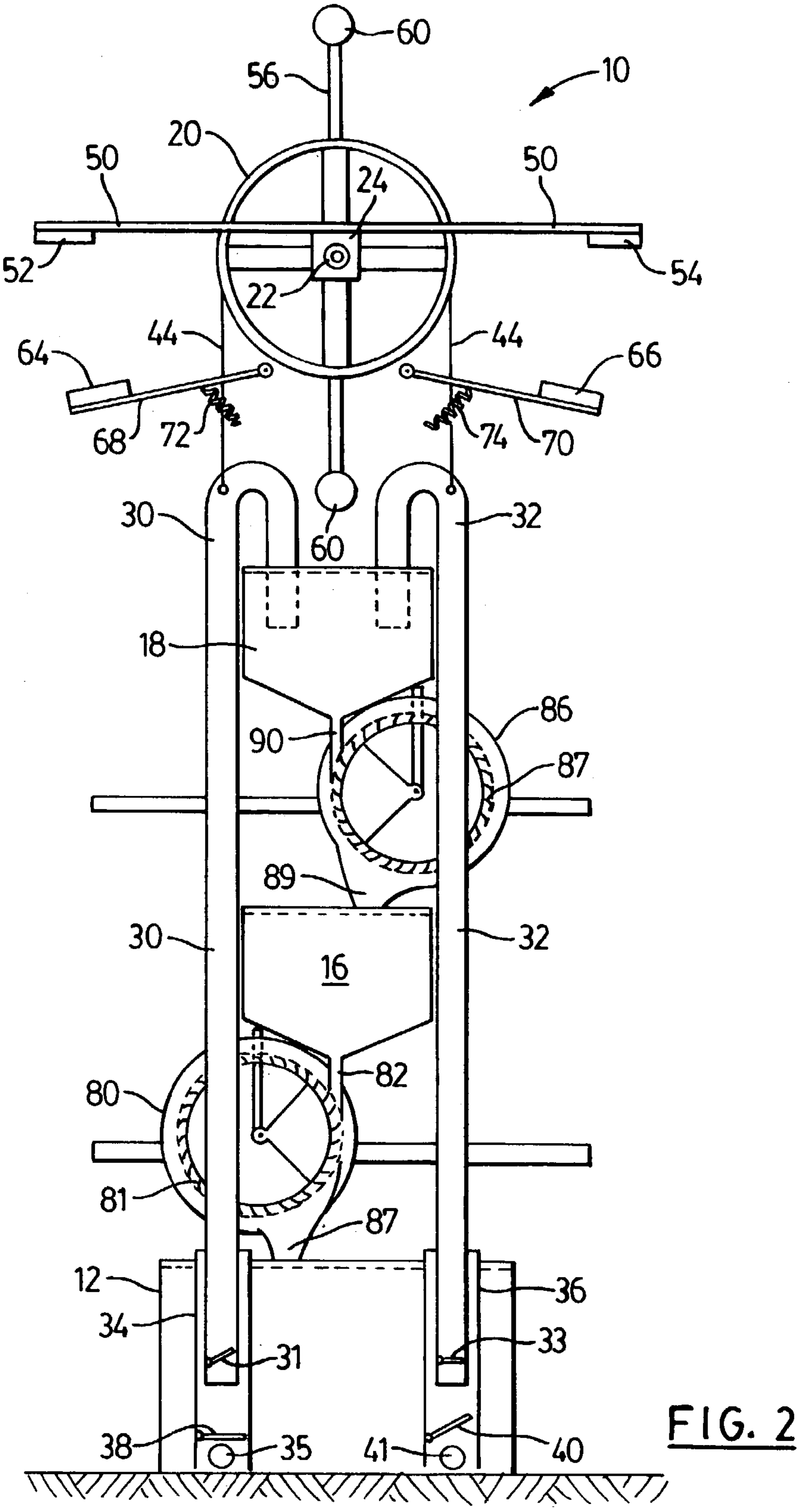
FIG. 2 is a front elevational view of part of the apparatus of FIG. 1.

Referring to FIGS. 1 and 2, apparatus 10 includes a reciprocating drive mechanism which comprises a circular ring 20 is mounted to frame 14 at the top of the frame 14 by a pin 22 through the hub 24 of the ring so that the pin 22 rotates in a bearing housing 23 (FIG. 1) attached to frame 14 so that the ring 20 can pivot around pin 22. A pair of vertically upright pipes 30 and 32 are long enough to convey liquid from the first bottom reservoir 12 to the upper third reservoir 18. Each pipe 30 and 32 are inserted into larger diameter pipes 34 and 36 respectively which are each mounted vertically upright in tank 12. Located at the bottom of pipe 30 is a valve 31 for passing water from tank 12 up into pipe 34 through a hole 35 in the wall of pipe 34 and at the bottom of the larger diameter pipe 34 is a valve 38. Similarly, located at the bottom of pipe 32 is a valve 33 and a valve 40 is located at the bottom of the larger diameter pipe 36 which receives pipe 32 for passing water from tank 12 up into pipe 36 through a hole 41 in the wall of pipe 36. The reciprocating drive mechanism includes a cable 44 is connected at one end to pipe 30 at its top end and the other end of cable 44 is connected to the top end of pipe 32. The outer or peripheral rim of ring 20 has a groove extending about the circumference thereof large enough to receive therein cable 44 so that as ring 20 rotates one way, one of the pipes is raised and the other lowered, and vice versa.

The reciprocating drive mechanism includes a rod 50 connected to ring 20 across its diameter and the ends of rod 50 have magnets 52 and 54 attached thereto. In the equilibrium position with no movement and pipes 30 and 32 level with each other, rod 50 is substantially horizontal. A rod 56 is also attached to ring 20 but is perpendicular to rod 50 so that it is vertical in the equilibrium position shown in FIG. 2. The reciprocating drive mechanism also includes a counterbalance weight 60 located at each of the ends of rod 56. Rod 50 with the magnets 52 and 54 attached at its ends swings like a pendulum when the device is working so that as the ring 20 rotates one way, one of the pipes 30 (or 32) is lifted and the other is lowered.

Referring again to FIGS. 1 and 2, a second set of magnets 64 and 66 are attached to the ends of rods 68 and 70 respectively. Rod 68 is pivotally attached to frame 14 so that magnet 64 is spaced from magnet 52 and magnets 64 and 52 repel each other when in close proximity. A spring 72 is connected between frame 14 and rod 68 so that when magnet 64 is not interacting with magnet 52 spring 72 pulls rod 68 down in the position shown in FIG. 2. Similarly, rod 70 is pivotally attached to frame 14 so that magnet 66 is spaced from magnet 54 and magnets 54 and 66 repel each other when in close proximity. A spring 74 is connected between frame 14 and rod 70 so that when magnet 66 is not interacting with magnet 54 spring 74 pulls rod 70 down in the position shown in FIG. 2.

A first lower turbine 80 is supported by frame 14 and is positioned below the middle liquid tank 16 so that as liquid (preferably water) flows out of tank 16 through outlet conduit 82 at the bottom of tank 16 it turns turbine 80 and after the turbine blades 81 are turned the water drains into the lower tank 12. Similarly, a second turbine 86 is supported by frame 14 and is located below the upper liquid tank 18 and is in flow communication with tank 18 through outlet conduit 90 so that as water flows out of tank 18 through conduit 90 the water turns turbine blades 87 and thereafter the water flows through passageway 89 into water tank 16. Each turbine includes two fly wheels with one being to minimize the vibration of gear trains and the other used to balance the turbine rotation.

Referring specifically to FIG. 1, a connecting rod 76 is connected at one end thereof to the end of rod 50 to which magnet 54 is attached and is connected at the other end to a circular disc 78, which forms part of turbine 86. Rod 50 will swing within designed range with the help of magnets 52, 54, 64 and 66, balance mass and power received from circular disc 78 through connecting rod 76.

The clockwise rotation of ring 20 helps to lift up liquid pipe 30 while at the same time pipe 32 is lowered. During the upward movement of pipe 30 liquid from the bottom reservoir tank 12 enters pipe 34 through its associated hole 35 and up through the open valve 38. When the valve 38 of pipe 34 is open, the valve 31 of pipe 30 automatically closes due to the fluid pressure on it. Thus pipe 30 carries liquid upward and the liquid drains from pipe 30 into the top reservoir 18. On the other hand, as the other pipe 32 goes down into pipe 36, liquid enters into pipe 32 through its control valve 33. In this situation, the valve 40 of pipe 36 remains closed. In the reverse cycle, liquid held in pipe 32 is delivered into tank 18.

Figure 3:
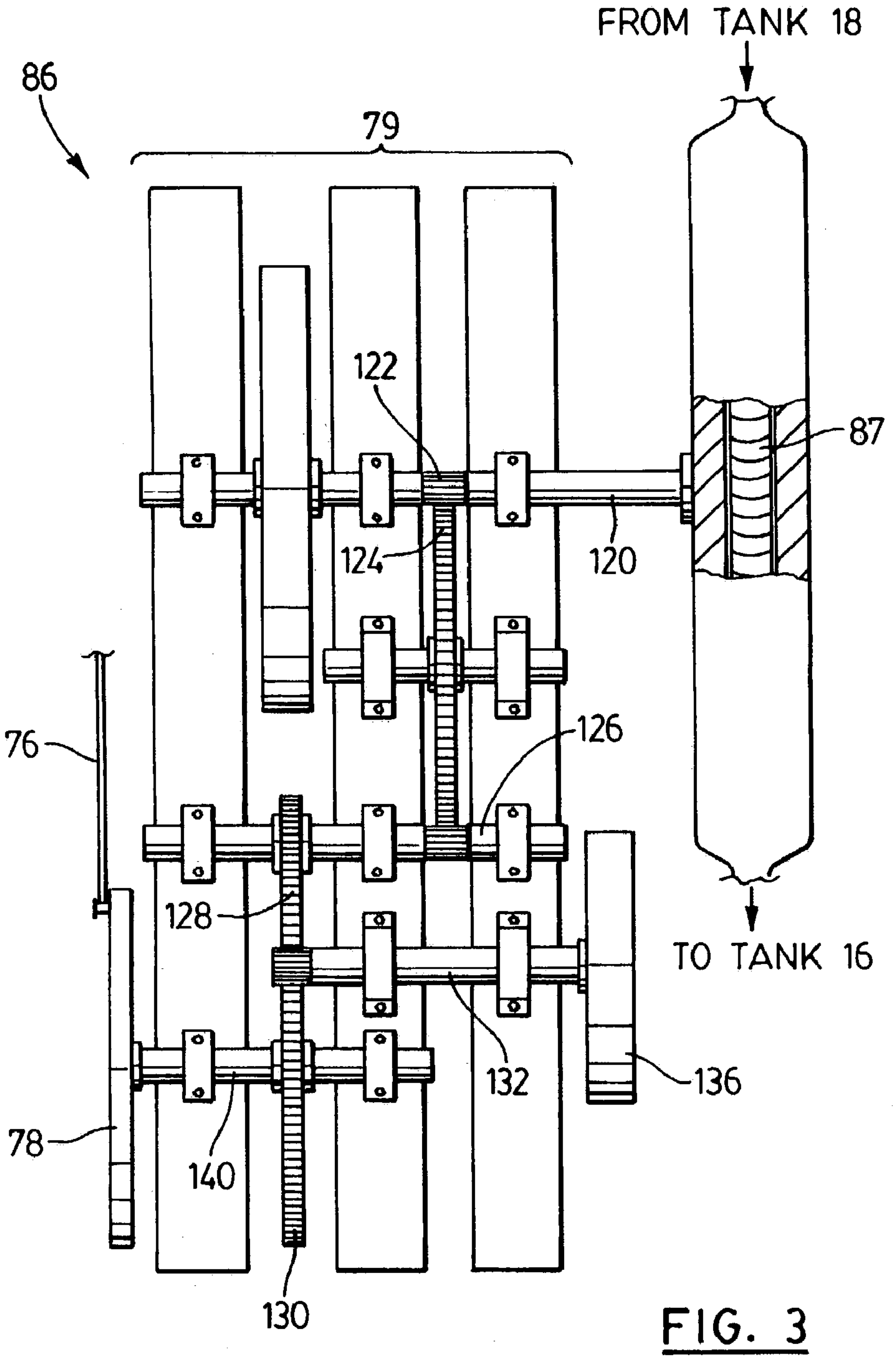
FIG. 3 is a view, broken away of a first turbine forming part of the apparatus of FIG. 1.

Referring now to FIG. 3, the turbine 86 includes a circular disc with turbine blades 87 in a chamber through which the liquid flows. As the liquid turns the disc with blades 87, shaft 120 is rotated which rotates a gear train 79 which includes a toothed portion 122 of shaft 120 engaged with a gear 124 which engages and rotates a shaft 126 which in turn is coupled to a gear 128 which rotates a gear 130 and a shaft 132. Shaft 132 is connected to a flywheel 136 and gear 130 is on a shaft 140 which is connected to disc 78 thereby rotating disc 78. The end of rigid rod 76 is connected to the disc 78 at an effective radius from the centre of disc 78 to give the desired angular pivoting of wheel 20 thereby restricting the amplitude of oscillation up and down of the two ends of rod 50 with magnets affixed thereto. If the radius is too small the ring 20 would not pivot enough to lift the pipes an appropriate vertical height.

Figure 4:
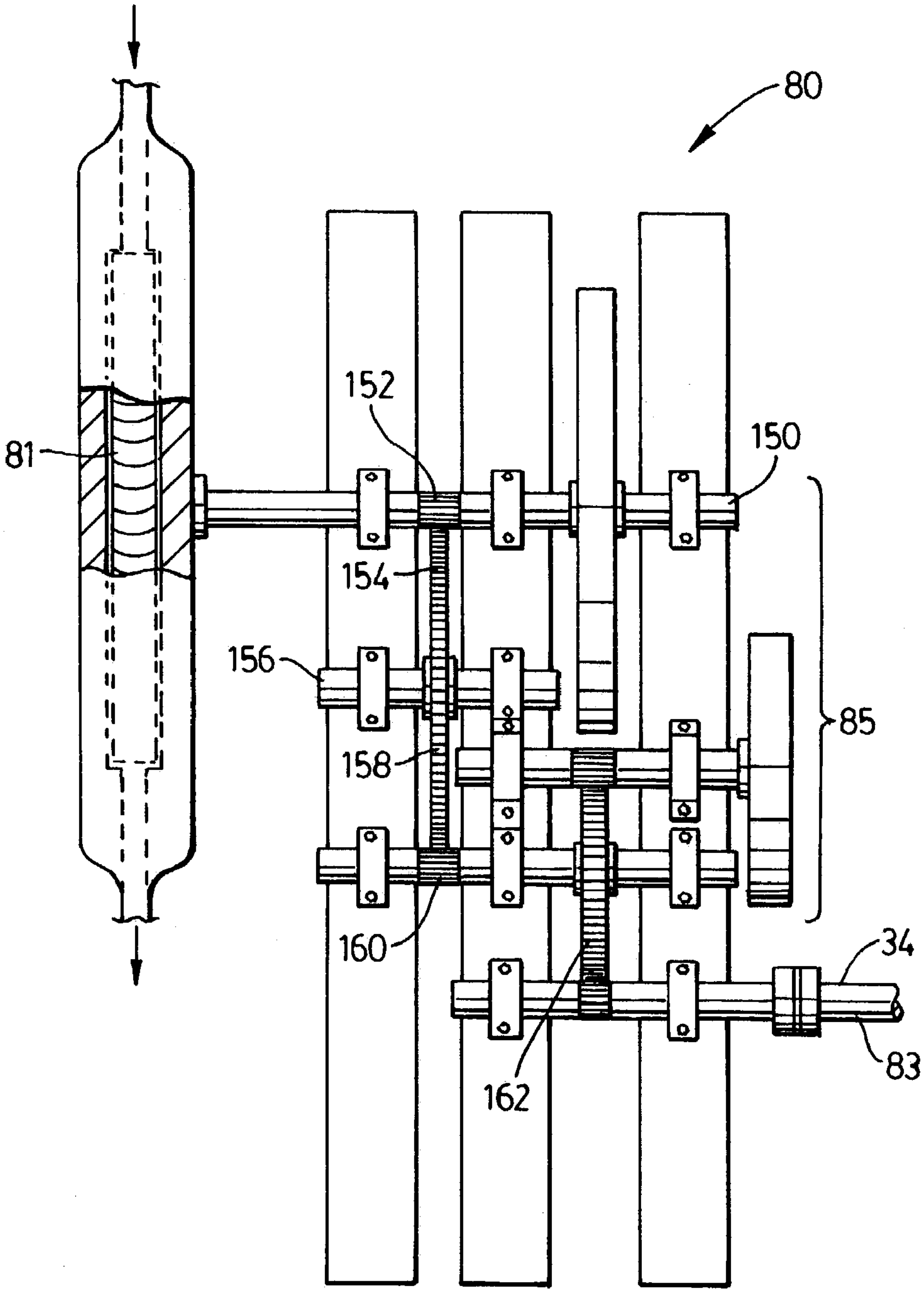
FIG. 4 is a view, broken away of a second turbine forming part of the apparatus of FIG. 1.

Referring now to FIG. 4, the turbine 80 includes a circular disc with turbine blades 81 in a chamber through which the liquid flows. As the liquid turns the disc with blades 81 a toothed portion 152 of shaft 150 engages a gear train 85 which includes a gear 154 which engages and rotates a shaft 156 which in turn is coupled to a gear 158 which rotates a shaft 160. Shaft 160 is connected to a gear 162 and gear 162 rotates shaft 83 which is connected to a generator (not shown).

The downward flow of liquid fluid from tank 18 through the associated outlet passageway 90 rotates the turbine 86 as the liquid hits the turbine blades 87 of the turbine. The rotation of this turbine 86 helps to keep disc 78 rotating through gear train 79 and since disc 78 is coupled to rod 50 and ring 20 by connecting rod 76, this keeps the ring 20 pivoting back and forth which keeps the system running continuously without any further external torque/input being required.

Similarly, the downward flow of liquid from reservoir 16 through outlet 82 rotates the power turbine 80 due to liquid hitting the turbine blades 81 of this turbine. The mechanical energy produced in this stage is transformed into electrical energy through coupling of the aforementioned electrical alternator (not shown) at the end of the rotating shaft 83.

To begin operation of apparatus 10, an initial torque is applied once to the apparatus to begin the oscillating movement of ring 20. This initial torque may be applied manually or with the help of a self-starter (with battery) at the end of the small disc 78, which is again coupled with rod 50 through connecting rod 76. The rotary motion of the disc 78 transforms into the linear motion of the connecting rod 50 as it is pivoted at a single point on the disc. The reciprocation of the connecting rod 50 again produces the pivoting action of the circular ring 20.

FIGS. 5 to 11 show a series of motion diagrams showing the apparatus 10 for converting gravitational energy to electrical energy in a first, to seventh position, respectively.

Figures 5, 6, 7:
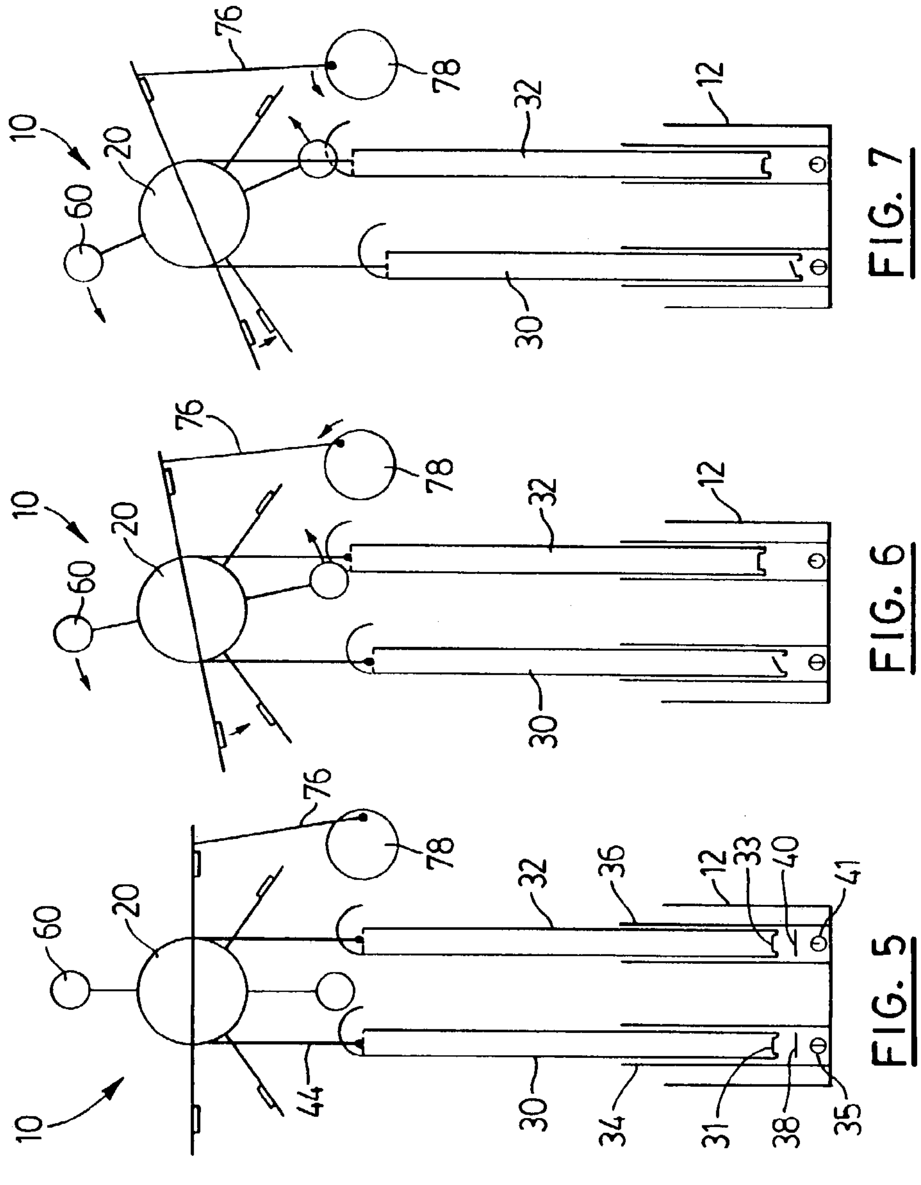
FIG. 5 is a motion diagram showing the apparatus for converting gravitational energy to electrical energy in a first position.
FIG. 6 is a motion diagram showing the apparatus for converting gravitational energy to electrical energy in a second position.
FIG. 7 is a motion diagram showing the apparatus for converting gravitational energy to electrical energy in a third position.

FIG. 5 shows the equilibrium position of the apparatus 10 when rod 50 is in the horizontal position and rod 56 along with its counter balances 60 are in the vertical position so that both the vertical pipes 30 and 32 are at the same level with respect to each other. All the valves located in pipes 30, 32, 34 and 36 (FIG. 2) remain closed when the pipes are level with each other in this position.

Figure 8:
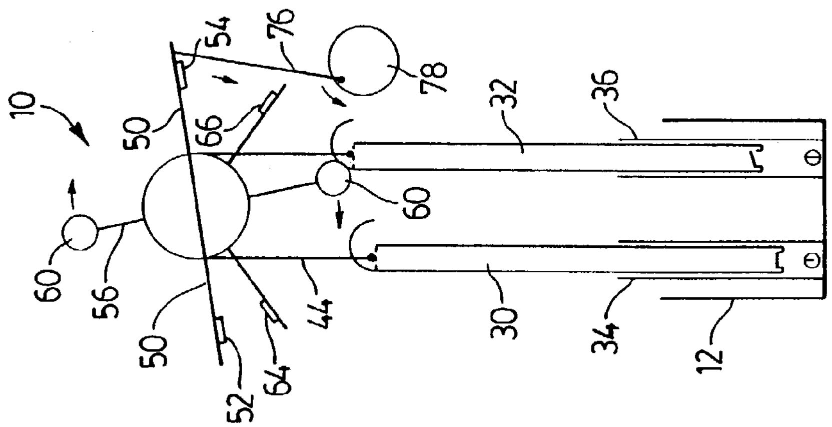
FIG. 8 is a motion diagram showing the apparatus for converting gravitational energy to electrical energy in a fourth position.

FIGS. 6, 7 and 8 progressively show the counter-clockwise rotation of the circular disc 78 and this helps to move the connecting rod 76 in the upward direction, which pushes the end of rod 50 with magnet 54 attached thereto in the upward direction. In this case, the repulsion between the magnets 54 and 66 also helps to push the rod 50 in the upward direction. The pairs of repulsive magnets (52, 64) and (54, 66) along with magnets 64 and 66 being mounted on spring biased arms 68 and 70 act to slow, dampen and smooth out the oscillating movement of ring 20 and bar 50. For example, as pipe 30 drops rapidly, the repulsion between magnets 52 and 64 helps to slow down the rotation of ring 20 so that the downward movement and stopping of pipe 30 is not sharp and abrupt which, along with the assist from connecting arm 76 connected to disk 78 and rod 50, helps to keep the ring 20 oscillating between in its angular range.

Since the rod 50 is connected to the ring 20 across its diameter, ring 20 also rotates in the counter-clockwise direction which raises pipe 32 since it is connected to the end of the cable 44 being lifted. During this upward movement of pipe 32, pipe 30 is lowered (FIGS. 6, 7 and 8) and with valve 31 opened and valve 38 closed so that liquid from the bottom reservoir tank 12 enters the pipe 30 and as liquid enters pipe 30 at the bottom it forces liquid out at the top of the pipe 30 into reservoir 18. During this downward movement of pipe 30, valve 40 is open so that liquid fills pipe 36 through hole 41 with valve 33 of pipe 32 being configured to automatically close due to the fluid pressure on it.

Figure 11:
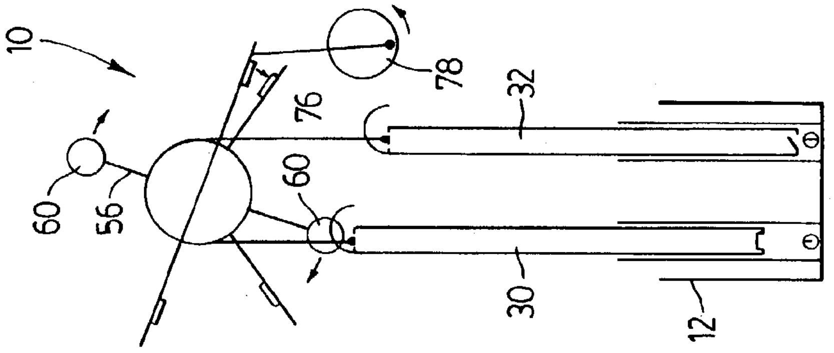
FIG. 11 is a motion diagram showing the apparatus for converting gravitational energy to electrical energy in a seventh position.
Figure 10:
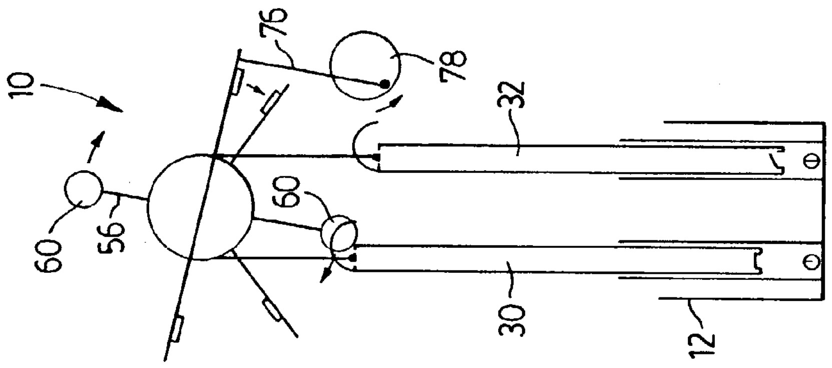
FIG. 10 is a motion diagram showing the apparatus for converting gravitational energy to electrical energy in a sixth position.
Figure 9:
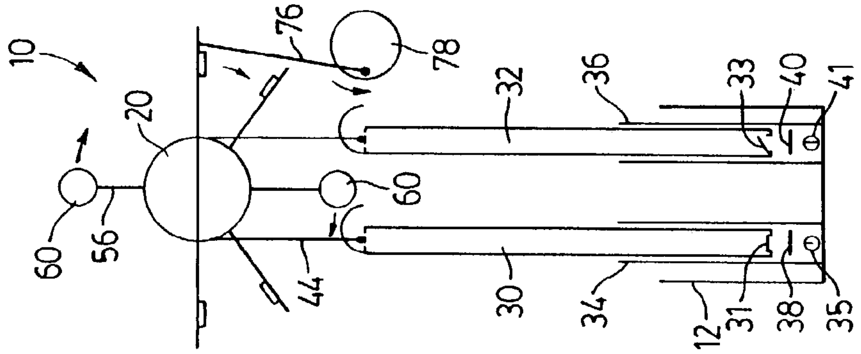
FIG. 9 is a motion diagram showing the apparatus for converting gravitational energy to electrical energy in a fifth position.

Similarly, FIGS. 9–11 show the part of the cycle in which pipe 32 is lowered and pipe 30 is raised during which liquid enters pipe 32 with valve 33 open and valve 40 closed and the liquid entering the bottom of pipe 32 forces liquid out of the top of pipe 32 into reservoir 18. During this part of the cycle in which pipe 32 is lowered and pipe 30 is raised, valve 31 is closed (being configured to automatically close due to the fluid pressure on it) and valve 38 is open so liquid enters into pipe 34 through hole 35.

Therefore, in apparatus 10, the vertical pipes 30 and 32 lift the liquid from the bottom reservoir 12 to the top reservoir 18 with the help of their reciprocating movement in upward and downward directions and therefore acts as conventional pumps. The two sets of magnets are configured so that as the magnets 52 and 54 of the swinging rod 50 come close respectively to the associated magnets 64 and 66 on arms 68 and 70 in the pairs of magnets (52, 64) and (54, 66) repel each other because they have the same magnetic pole. This ensures the horizontal rod 50 to swings in a designed degree of angular displacement. The two balance masses 60 are used on the vertical rod in order to ensure the swinging of the horizontal rod 50 is in a desired angular displacement range. While the system fluid is preferably water it will be understood any other safe liquid may be used.

The apparatus of the present invention is modular and may be expanded horizontally in which multiple systems are placed side by side with a single large support frame holding multiple sets of pipes and turbines. Therefore, the cost of construction will significantly be reduced due to the common use of supporting structures and the single large reservoir instead of individual reservoirs at the bottom of each unit.

The apparatus may also be increased in height, in the vertical direction by adding for example more reservoir tanks stacked to a greater height and more turbines placed in between the top and bottom liquid tanks. By making vertical supporting construction work, the swinging rod 50 may be placed at thirty feet interval vertically in order to produce large amount of power generation. Due to the increase of vertical lift of the system fluid level, the number of turbines may be proportionately increased with height. Therefore, the fixed cost of construction could also be reduced by using the common use of supporting structure and single reservoir instead of using individual reservoirs at the bottom of each unit.

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. An apparatus for converting gravitational energy to electrical energy, comprising:

a first tank for holding liquid and a support frame defining a tower extending vertically above said first tank;

a second tank for holding liquid secured to said support frame above said first tank;

at least a third tank for holding liquid secured to said support frame above said second tank;

a reciprocating drive mechanism being connected to the support frame above the third tank, a first turbine secured to said support frame between said second tank and said third tank, said first turbine being in flow communication with said third tank and said second tank, said reciprocating drive mechanism being connected to said first turbine by a rigid link member to assist in driving said reciprocating drive mechanism;

at least a second turbine secured to said support frame between said second tank and said first tank, said second turbine being in flow communication with said second tank and said first tank; and at least one pipe extending vertically, with said pipe having first and second ends with said first end located in said first tank and said second end positioned with respect to said third tank so liquid exiting said second end of said at least one pipe drains into said third tank, said at least one pipe having a first valve located at the first end thereof, said at least one pipe being connected to said reciprocating drive mechanism so that during operation said reciprocating drive mechanism reciprocates the at least one pipe vertically up and down, wherein as the at least one pipe moves down said first valve opens to allow liquid into the pipe and when the pipe moves up said first valve closes, wherein as said at least one pipe moves downwardly liquid flows from said second end of said at least one pipe into the third tank and flows down to said first turbine and rotates said turbine, said liquid flowing down into the second tank and flowing downwardly therefrom into said second turbine and rotates said second turbine, said second turbine being connected to a generator for producing electricity.

2. The apparatus according to claim 1 wherein said at least one pipe is a first pipe and a second pipe, said second pipe having a second valve at its first end portion located in said first tank, and wherein said reciprocating drive mechanism includes a circular frame having a central hub pivotally mounted on said support frame and constrained to pivot back and forth within a selected angular range, a flexible cable being connected to said two pipes, said circular frame having a peripheral groove to receive therein said cable, said cable hanging down vertically from both sides of said circular frame, and wherein said first pipe is attached to the cable hanging down on one side of the circular frame and the second pipe being attached to the cable hanging down on the other side of the circular frame, whereby when said circular frame pivots back and forth one of the first and second pipes is raised and the other is lowered, and wherein when said second pipe moves downwardly said second valve is open so liquid flows into the first end of the pipe and liquid flows from a second end of said second pipe into the third tank, said second valve being closed as said second pipe is moved upwardly.

3. The apparatus according to claim 1 wherein said reciprocating drive mechanism includes a first rod attached to said circular frame extending horizontally across a diameter of the circular frame, said rod having a first magnet at a first end of the rod and a second magnet attached at a second end of the rod, including a first support arm having a third magnet attached to said first support arm which repels said first magnet, the first support arm being pivotally attached to the support frame so that the third magnet is spaced from the first magnet, including a second support arm having a fourth magnet attached to second support arm which repels said second magnet, the second support arm being pivotally attached to the support frame so that the fourth magnet is spaced from the second magnet, and wherein when said first rod pivots so that said first end moves down the first magnet is repelled by the third magnet for slowing down the pivotal rotation of the circular frame during rotation thereof in one direction and when said second end moves down the second magnet is repelled by the fourth magnet for slowing down the pivotal rotation of the circular frame for slowing down the pivotal rotation of the circular frame during rotation thereof in the other direction.

4. The apparatus according to claim 2 wherein said reciprocating drive mechanism includes a first rod attached to said circular frame extending horizontally across a diameter of the circular frame, said first rod having a first magnet at a first end of the rod and a second magnet attached at a second end of the first rod, including a first support arm having a third magnet attached to said first support arm which repels said first magnet, the first support arm being pivotally attached to the support frame so that the third magnet is spaced from the first magnet, including a second support arm having a fourth magnet attached to second support arm which repels said second magnet, the second support arm being pivotally attached to the support frame so that the fourth magnet is spaced from the second magnet, and wherein when said circular frame pivots so that said first end of said first rod moves down the first magnet is repelled by the third magnet for slowing down the pivotal rotation of the circular frame during rotation thereof in one direction and when said second end moves down the second magnet is repelled by the fourth magnet for slowing down the pivotal rotation of the circular frame for slowing down the pivotal rotation of the circular frame during rotation thereof in the other direction.

5. The apparatus according to claim 3 wherein said first and second pipes are inserted into respective third and fourth pipes each having a diameter larger than a diameter of each of said first and second pipes, said third and fourth pipes being seated vertically in said first tank and each including a hole to allow inflow of liquid to into each of said third and fourth pipes, including a third valve in said third pipe above said hole in the third pipe and a fourth valve in said fourth pipe above said hole in the fourth pipe, and wherein when said first valve is closed as said first pipe is being raised, said third valve is open and liquid enters said third pipe and said second valve is open as said second pipe is being lowered and said fourth valve is closed so water enters said second pipe at its lower end and water drains into said third tank, and when said first valve is open as said first pipe is being lowered said third valve is closed, and when said second pipe is being raised said second valve is closed and said fourth valve is open.

6. The apparatus according to claim 1 wherein said first turbine includes a turbine wheel with turbine blades attached thereto which is turned by liquid falling onto said turbine wheel, said turbine wheel being connected to a first shaft which rotates with said turbine wheel, said turbine including a gear train engaged by said first shaft, and a disc rotated by said gear train with the rigid link member being connected at one end thereof to said disc at an effective radius from a centre of said disc to give a selected amplitude of oscillation back and forth of said reciprocating drive mechanism.

7. The apparatus according to claim 4 wherein said first turbine includes a turbine wheel with turbine blades attached thereto which is turned by liquid falling onto said turbine wheel, said turbine wheel being connected to a first shaft which rotates with said turbine wheel, said turbine including a gear train engaged by said first shaft, and a disc rotated by said gear train with the rigid link member being connected at one end thereof to said disc at an effective radius from a centre of said disc to give a selected amplitude of oscillation up and down of said first and second ends of said first rod.

* * * * *